LOWELL ROSEN
INVENTOR.

BY

ATTORNEYS.

United States Patent Office 3,540,790
Patented Nov. 17, 1970

3,540,790
METHOD AND MEANS FOR RECORDING AND RECONSTRUCTING HOLOGRAMS WITHOUT USE OF A REFERENCE BEAM
Lowell Rosen, Winchester, Mass., assignor to the United States of America as represented by the Administrator of the National Aeronautics and Space Administration
Filed Feb. 29, 1968, Ser. No. 709,399
Int. Cl. G02b 27/22
U.S. Cl. 350—3.5                8 Claims

ABSTRACT OF THE DISCLOSURE

Holograms having quite unique properties are made by angularly positioning the object with respect to the photographic plate such that laser light scattered from one portion of the object serves as the reference beam for the laser beam scattered from another portion of the object on the photographic plate. Reconstruction of the recorded hologram is accomplished by placing the reconstruction source (point or extended coherent or point or extended incoherent) at a position approximately duplicating the center position of the portion of the object which was furthest from the photographic plate during the recording process.

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

This invention relates in general to optical systems, and, more particularly, to a method and means for recording and reconstructing holograms of an object without the need for using a reference beam during the recording process.

Holography is a method of image formation with optical wavefronts reconstructed by means of special photographic transparencies called holograms. Whereas conventional photography records a recognizable image of the object, holography records the reflected light waves themselves, an unrecognizable array of blobs, specks and whorls. Also, whereas the ordinary photographic film causes images of a three-dimensional scene to be collapsed into a single plane, a hologram maintains the three-dimensional properties of the image by means of a reference wave which is simultaneously recorded on the photographic film.

The technique of wavefront reconstruction, holography, had its conception in the spatial filter work of Ernest Abbe in 1896; its birth in the one-beam or on-line technique permitted by the development of the laser; and is now in its incipient adulthood.

An important advantage of a hologram over an ordinary photographic film is that a hologram records far more information, which provides a realism unattainable by any other means. Holograms are characterized by high resolution and large depth of field. The reconstructed images have several unique properties. For example, they are three-dimensional and exhibit parallax and perspective just as any solid object would. An observer can see around the image by moving his head. Also, since light from each part of the object covers the entire area of the hologram plate, any portion of the plate contains information from all of the object. Thus, if the plate were broken or blemished any small portion of it will reconstruct the object completely with only a loss in detail.

Because of these advantages holographic recording of an object has great utility in the fields of engineering, applied physics, and mathematics in a wide range of problems. For example, holograms are useful in studying moving objects such as particle density in gases and plasmas, in communication systems, in character recognition systems, as information coding devices, in interferometry, in display systems, etc.

As the technique of wavefront reconstruction is now most often used, an object is illuminated by coherent light from a laser. A photographic plate receives "unfocused" light reflected from or transmitted through the object. Also, a reference beam is incident upon the plate such that the object does not interfere with the coherent reference beam. The object-scattered waves interact with the reference waves producing fringe patterns embodying both the amplitude and the phase from the light reflected from the object. The photographic plate is then developed chemically in a conventional manner. When the hologram is placed in a coherent light beam the reconstructed waves are indistinguishable from the original waves—even though the object has long since been removed.

However, a disadvantage of the usual technique of recording a hologram with an off-axis reference beam is that source compensation of some type was needed to reconstruct the hologram image when an external source reference beam on recording was used. Source compensation techniques, in general, are very critical as they require the hologram to be re-positioned in its original position to a very high degree of accuracy.

OBJECTS AND SUMMARY OF THE INVENTION

An object of this invention is to provide a method and means for recording holograms of an object without the need for using any external source as a reference beam.

Another object of the invention is to provide a method and means for the recording of holograms without a reference beam which can be reconstructed with either a point or extended coherent source or a point or extended incoherent source.

To the accomplishment of the foregoing objects, the present invention comprehends the placement of the object at an angular position with respect to the photographic, recording medium such that the distance from the furthest segment of the object to the recording medium is at least five times the distance of the segment closest to the plate, and the distance between centers of the furthest and closest segments is at least five times the distance from the closest segment to the recording medium. A hologram recorded in the instant manner can be reconstructed by placing the reconstruction source at a position approximately duplicating the center of the object segment which was furthest from the recording medium during the recording process.

BRIEF DESCRIPTION OF THE DRAWINGS

The novel features that are considered characteristic of this invention are set forth with particularity in the appended claims. The invention, both as to its organization and mode of operation, as well as additional objectives and advantages thereof, will best be understood from the following description when read in connection with the accompanying drawings, in which:

DESCRIPTION OF THE PREFERRED EMBODIMENT

Figure 1:
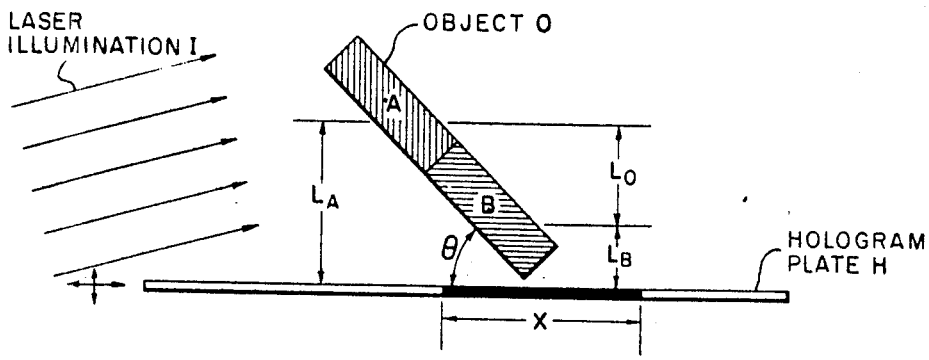
FIG. 1 is a diagram of the instant technique for recording a hologram of an object without using a reference beam by placing one segment of the object closer to the photographic plate than another segment.
Figure 2:
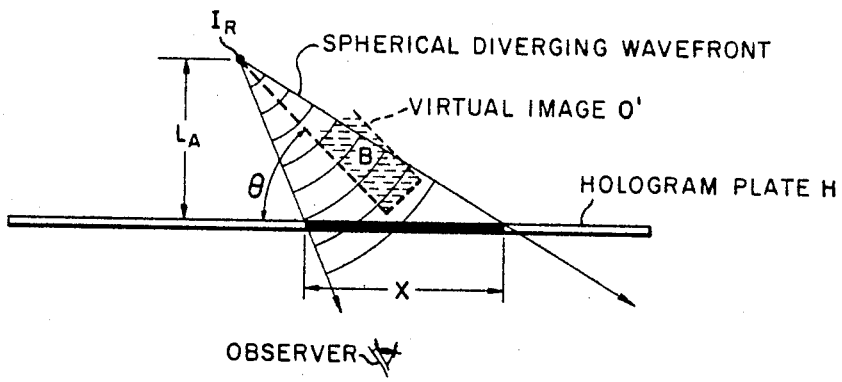
FIG. 2 is a diagram illustrating the reconstruction of a hologram recorded by the technique illustrated in FIG. 1 wherein the reconstruction source is positioned at a point corresponding to the central point furthest away in FIG. 1.

Shown in FIG. 1 is a diagram illustrating the instant wavefront reconstruction imaging technique by which a hologram can be recorded without any external reference beam and still have quite unique properties. As shown in FIG. 1, an object O is illuminated by an object illuminating beam I coming from the side of the object. It is to be noted that a hologram plate H (typically a Kodak 649F film plate) is positioned such that none of the incident laser illumination (typically of the 6328 A. type) strikes the hologram plate directly. Only the laser light scattered from the object O exposes the hologram plate H. The object O is positioned close to the hologram plate H so that one part of the object, e.g. segment B, is closer to the plate H than another portion of the object, e.g. segment A. If, as shown, the object O has an overall size $L_0$ (namely, separation between the centers of the two extreme segments in distance), a film plane hologram is satisfactorily recorded when the distance $L_B$ (the distance from plate H to the center of the segment B) is less than the distance $L_0$ (i.e., $L_B < L_0/5$) and when $L_A$ (the distance from plate H to the center of the segment A) is greater than five times the distance $L_B$. Under these conditions the hologram recording of the segment B will be recorded on a region X of the film plate H and will show satisfactory resolution and three-dimensional features.

After the proper exposure time and the conventional developing, the hologram of segment B of the object O recorded in FIG. 1 is reconstructed with a source of illumination $I_R$, which can be either point of extended coherent laser light or point or extended incoherent spectral light. The reconstruction source $I_R$ is located at a position duplicating the original position of segment A of the object O and in the same angular orientation relative to the segment B. The hologram reconstruction is seen as a virtual image appearing on the same side of the hologram plate H as the source $I_R$.

Accordingly, there has been shown and described herein a novel, useful and improved method and apparatus for allowing holograms to be recorded of an object without any requirement for an external reference source.

A feature of the invention is that it now becomes possible to reconstruct holograms which do not require source compensation.

Another feature of the invention is the teaching that there is no critical hologram or reconstruction source registration.

And still another feature of the invention is the recording of holograms which have very little color dispersion on reconstruction with any kind of light source.

The specific embodiment herein described is intended to be merely illustrative and not restrictive of the invention. Various modifications in changes in form and detail will be obvious to those skilled in the art. It is therefore intended in the appended claims to cover all such changes and modifications as fall within the true spirit and scope of the invention.

What is claimed is:

1. The method of recording a hologram of an object on a recording medium comprising the steps of:
   positioning the object in close proximity to the recording medium,
   illuminating said object with a source of coherent electromagnetic radiation,
   and angularly positioning said object and said recording medium with respect to each other such that electromagnetic radiation scattered from the segment of said object more distant from said recording medium functions as a reference beam for the coherent radiation scattered from the segment of said object closest to said recording medium.

2. The method as described in claim 1 wherein said step of angularly positioning said object and said recording medium further includes the steps of placing said object such that the distance from the segment of said object furthest from said recording medium is at least five times the distance of the segment of said object closest to said medium, and placing the object to be recorded such that the distance between centers of said furthest and closest segments of said object is at least five times the distance from the segment closest to said recording medium.

3. The method of reconstructing a hologram recorded by the method of claim 1 comprising the steps of:
   illuminating said recorded hologram with a reconstruction source of electromagnetic radiation,
   and positioning said reconstruction source at a position approximately duplicating the position of the center of the segment of the recorded object which was furthest from the recording medium during said recording process.

4. Apparatus for reconstructing a hologram recorded by the method described in claim 1 comprising:
   means for illuminating said recorded hologram with a reconstruction source of electromagnetic radiation,
   and means for positioning said reconstruction source to approximately duplicate the position of the center of the segment of the object which was furthest from the recording medium during the recording process.

5. The apparatus as defined in claim 4 wherein said reconstruction source comprises a point source of coherent electromagnetic radiation.

6. The apparatus as defined in claim 4 wherein said reconstruction source comprises an extended source of coherent electromagnetic radiation.

7. The apparatus as defined in claim 4 wherein said reconstruction source comprises a point source of incoherent electromagnetic radiation.

8. The apparatus as defined in claim 4 wherein said reconstruction source comprises an extended source of incoherent electromagnetic radiation.

References Cited

Rosen et al.: Applied Physics Letters, pp. 140–142, vol. 10, No. 5, March 1967.

Collier et al.: Applied Physics Letters, vol. 8, No. 2, pp. 44–46, January 1966.

DAVID SCHONBERG, Primary Examiner

R. L. SHERMAN, Assistant Examiner